United States Patent
Olmsted

(10) Patent No.: US 7,302,775 B2
(45) Date of Patent: Dec. 4, 2007

(54) POWER BUS AND STRUCTURE FOR A BARRIER MOVEMENT OPERATOR

(75) Inventor: Robert J. Olmsted, Wood Dale, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 10/844,016

(22) Filed: May 12, 2004

(65) Prior Publication Data

US 2005/0254201 A1 Nov. 17, 2005

(51) Int. Cl.
*E05F 15/16* (2006.01)
*H05K 7/00* (2006.01)

(52) U.S. Cl. .......................... 49/199; 361/611; 361/683

(58) Field of Classification Search ................ 361/611, 361/624, 648, 679–683; 49/197–206
See application file for complete search history.

(56) References Cited

U.S. PATENT DOCUMENTS

| | | | | |
|---|---|---|---|---|
| 2,564,510 A | * | 8/1951 | Shoemaker | ................. 356/155 |
| 2,736,553 A | * | 2/1956 | Brown | ........................ 160/188 |
| 3,119,608 A | * | 1/1964 | Bateman | ..................... 49/139 |
| 3,135,469 A | * | 6/1964 | Hanson | ........................ 362/85 |
| 3,683,101 A | | 8/1972 | Liberman | |
| 3,699,235 A | * | 10/1972 | Wasson et al. | ................. 174/48 |
| 3,725,568 A | | 4/1973 | Stanley | |
| 3,931,452 A | * | 1/1976 | Nilsson | ........................ 174/48 |
| 5,732,898 A | * | 3/1998 | Odessky et al. | ............. 242/377 |
| 5,969,637 A | | 10/1999 | Doppelt et al. | |
| 6,184,641 B1 | | 2/2001 | Crimmins et al. | |
| 6,198,047 B1 | * | 3/2001 | Barr | .......................... 174/68.3 |
| 6,350,135 B1 | * | 2/2002 | Acklin et al. | ................ 439/211 |

FOREIGN PATENT DOCUMENTS

| | | |
|---|---|---|
| FR | 2 823 022 | 4/2001 |
| WO | WO 00/37748 A1 | 6/2000 |

* cited by examiner

*Primary Examiner*—Lisa Lea-Edmonds
*Assistant Examiner*—Anthony Q Edwards
(74) *Attorney, Agent, or Firm*—Fitch, Even, Tabin & Flannery

(57) ABSTRACT

A barrier movement operator with improved mounting and power distribution capabilities is disclosed. The disclosed system includes an elongate member mounted from an overhead structure in a substantially horizontal manner. A head end of a barrier movement operator may be supported by the elongate member and the elongate member may be used to mount accessory devices such as lights and extension cords, and to provide mains voltage to the mounted accessories.

2 Claims, 5 Drawing Sheets

POWER BUS AND STRUCTURE FOR A BARRIER MOVEMENT OPERATOR

The present invention relates to barrier movement operators and particularly to apparatus for mounting barrier movement operators and connecting such operators to accessories.

Barrier movement operators generally comprise power and control systems for responding to operator inputs and sensed conditions to move a barrier between open and closed positions with respect to an opening. The barrier may be a door, a gate, a window, a window shade/protector or similar apparatus. Garage door operators are a common form of barrier movement operator. One type of garage door operator comprises a head end with control circuitry and a motor which extends and retracts a trolley connected to the door. The trolley moves along a rail connected between the head end and a support wall of a garage at a point above the garage opening. Such a trolley and rail type of garage door operator is generally supported from an overhead structure such as the ceiling joists of a garage. Support is often achieved by vertical metal support members from the housing of the head end to the ceiling joists which may result in a less than stylish connection. Further, it may be desirable to provide ancillary equipment or accessories to improve the functionality of the garage in which the garage door operator is mounted. For example, it may be desirable to place additional lighting in the garage, which in some instances, may be controlled by the controller of the head end. Also, it may be desirable in the garage to provide a readily available extension cord and/or a mechanic's light and the garage door operator itself may gain advantage to having an attached security camera, monitor, motion sensor and other sensing equipment. At present, the inclusion of such additional equipment results in a confused mix of non-similar items affixed throughout the garage. The present system envisions an improved system for supporting a barrier movement operator and providing ancillary equipment.

DESCRIPTION

Figure 1:
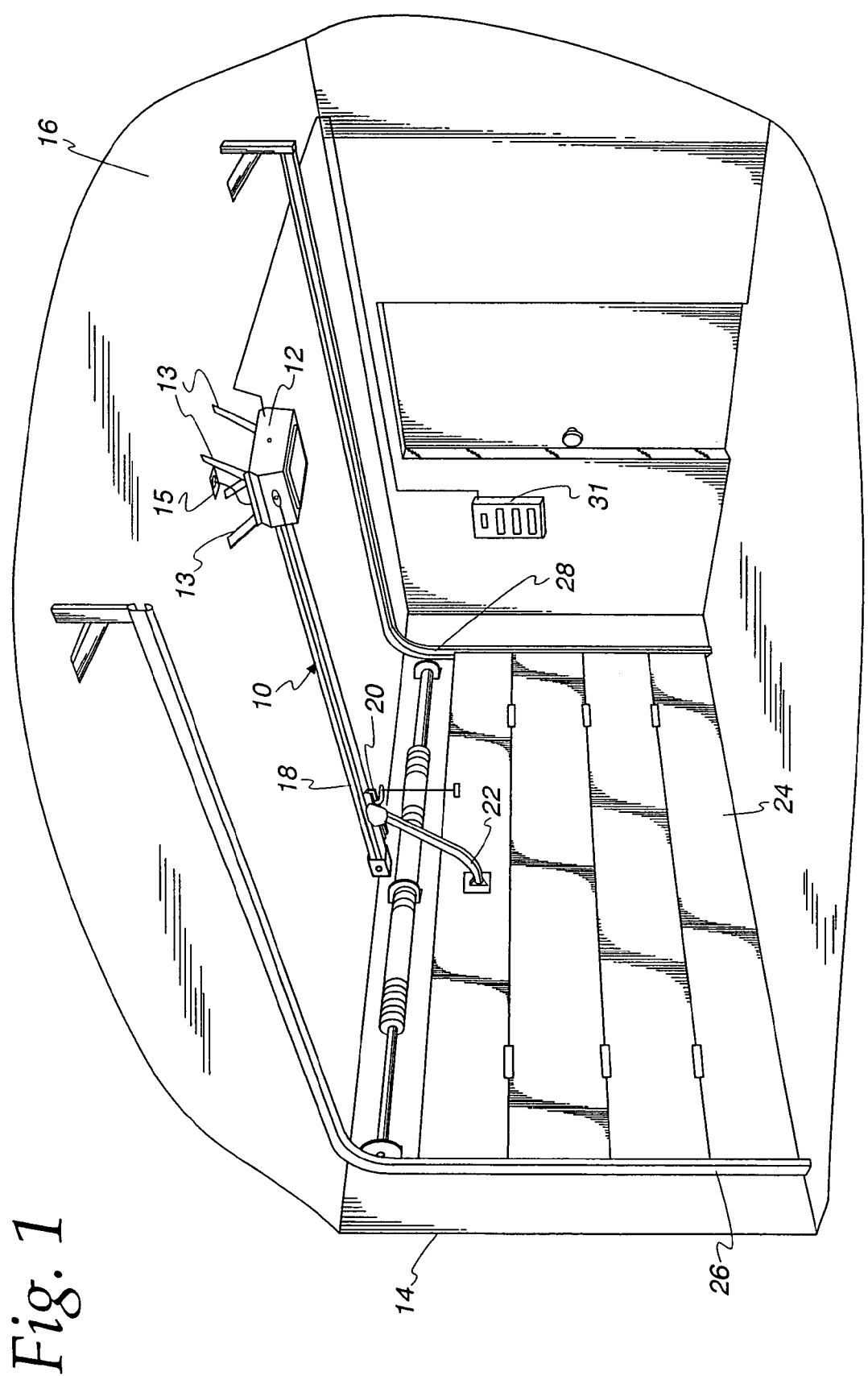
FIG. 1 is a perspective view of a mounted prior art barrier movement operator.

FIG. 1 is a perspective view of the inside of a secure area such as a garage, having a known barrier movement operator. The area has a ceiling 16 and a front wall 14 with a doorway (not shown) therethrough which is opened and closed by a paneled garage door 24. The position of the door 24 is controlled by a barrier movement operator head end 12 which moves a trolley 20 out and back along a rail 18. The trolley 20 is connected to door 24 by a trolley/door arm 22. The door 24 includes rollers at its edges which engage doorguides 26 and 28 and as the trolley 20 is drawn toward the head end 12 the door 24 is raised in the doorguides to a substantially horizontal position. The movement of the door may be controlled by user interaction with a wall control unit 31 which signals the head end of the user's requests. The head end 12, which includes an electric motor, is powered from a mains voltage outlet 15 and is supported from the joists of the ceiling by support members 13. Other sensors and signaling devices may be used to control barrier movement, but are not described because they are not necessary for an understanding of the present invention.

Figure 2:
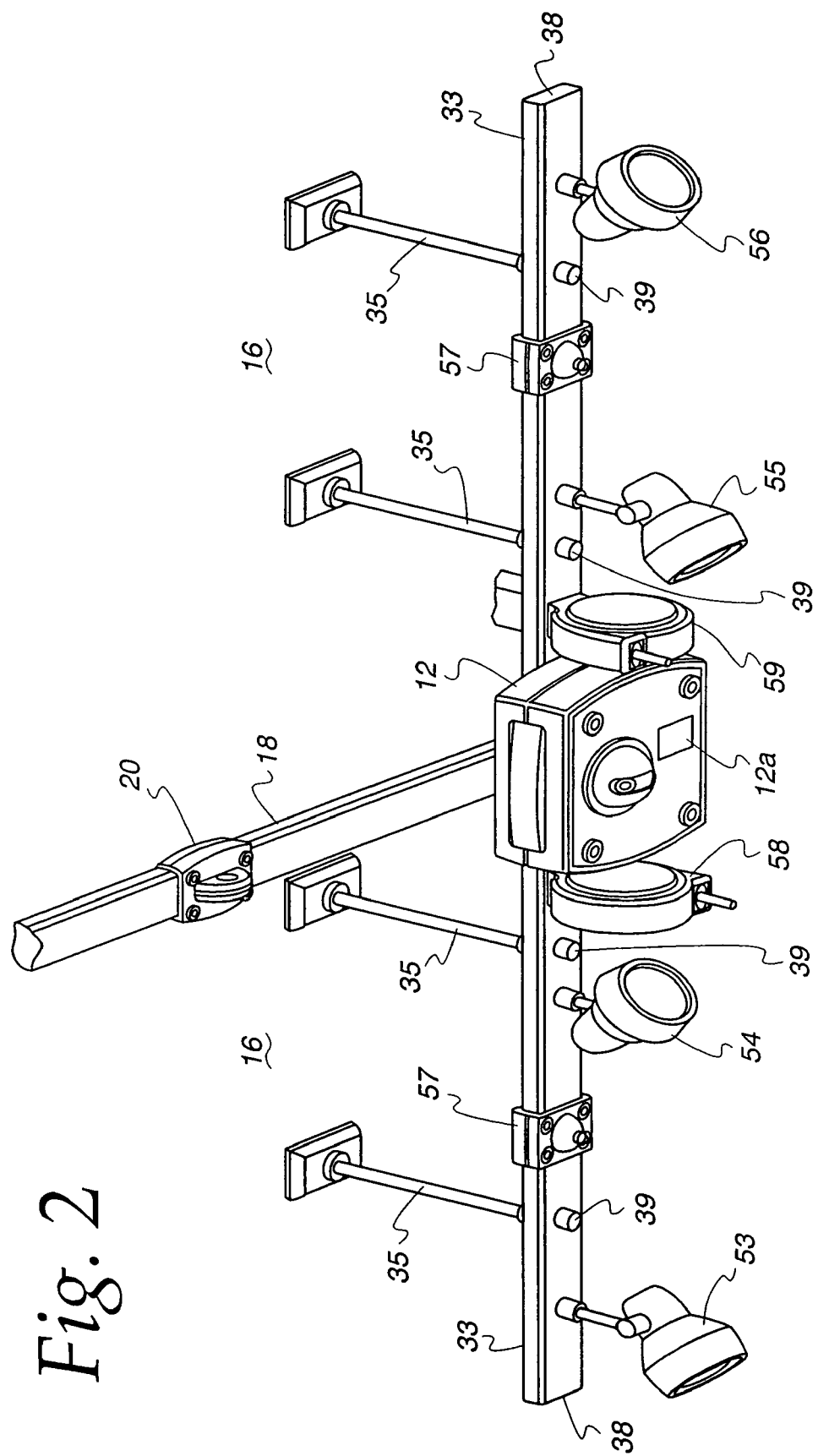
FIG. 2 is a perspective view of an improved barrier movement operator mounting.
Figure 3:
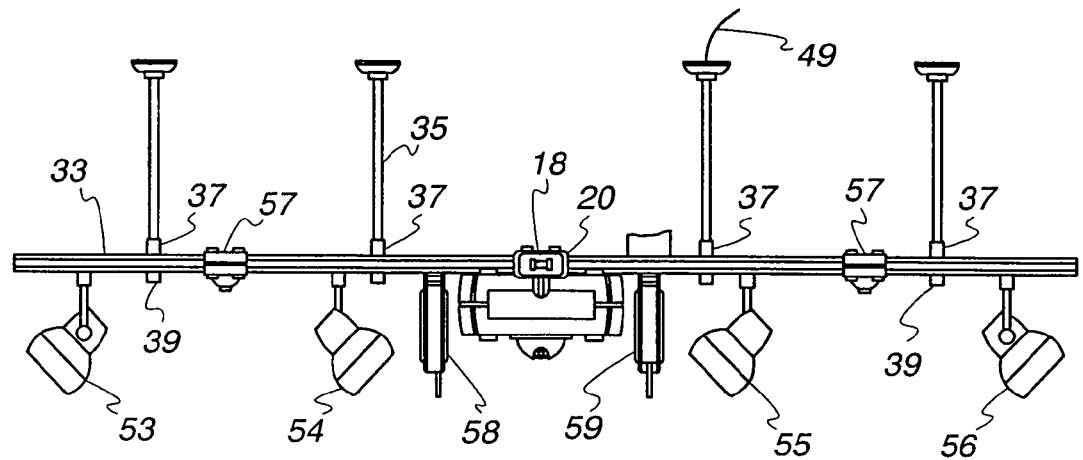
FIG. 3 is a front plan view of the mounting of FIG. 2.
Figure 4:
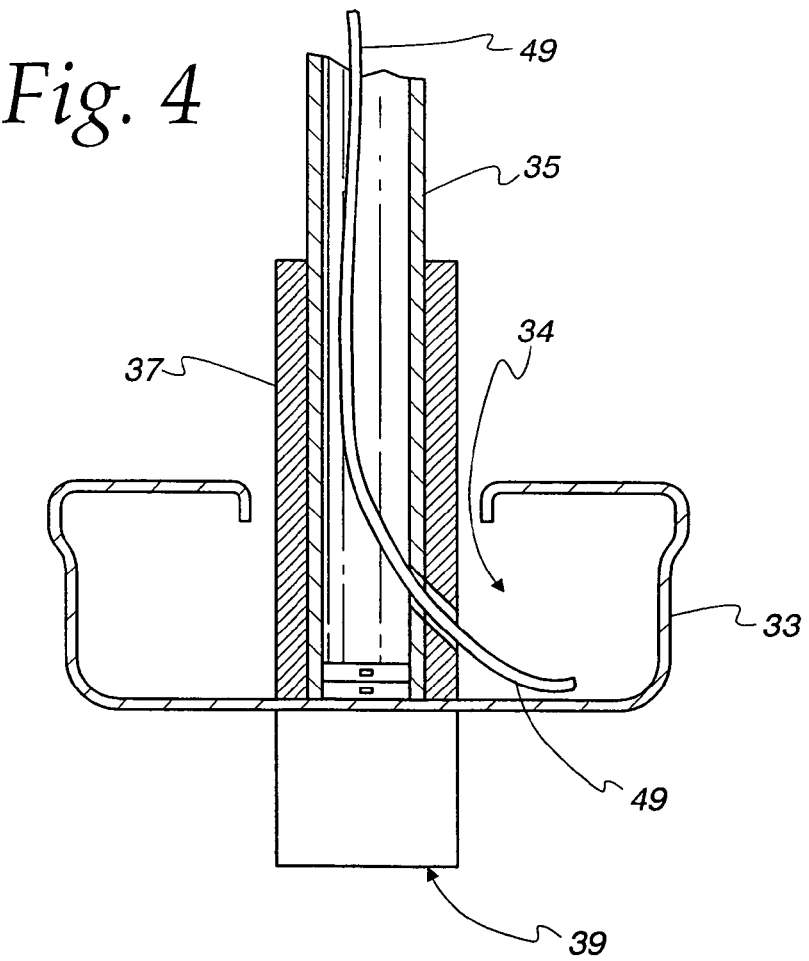
FIG. 4 is an end view of an elongate member and vertical support used in FIG. 2.

FIG. 2 is an upward perspective view of a combined barrier movement operator support and power busing system. The trolley of the FIG. 2 arrangement may be connected to a trolley/door arm 22 as shown in FIG. 1 to raise and lower a door or other barrier. FIG. 3 is a view of the same structure as FIG. 2, but the view is from the front of the garage, along the trolley rail 18. The structure of FIG. 2 includes an elongate member 33 which is supported by a plurality of vertical members 35 from an over head structure. The over head structure may be ceiling joists or another support member secured to the overhead structure of the garage. Elongate member 33, which is shown in cross section in FIG. 4, comprises an open trough 34 which may be fabricating by roll forming 16 gauge sheet steel. The open trough 34 runs the length of the elongate member and may be used to provide power to accessories attached to the elongate member as discussed below.

Vertical members 35 may comprise hollow tubes having a shoulder portion 37 at a bottom thereof. Shoulder portion is affixed to the hollow tube vertical member 35 and includes female threads at the open end thereof. The elongate member 33 includes a plurality of mounting holes and the vertical members 35 are connected to the elongate member 33 by bolts 39 screwed into the female inner threads of shoulders 37 through the holes. The open ends of elongate member 33 may be closed by end caps 38.

Figure 6:
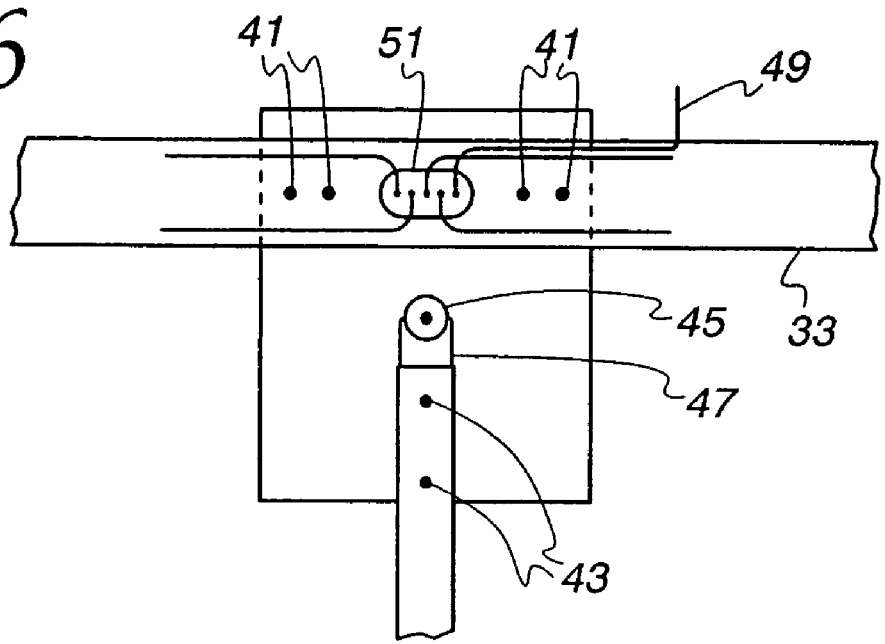
FIG. 6 is a top view of the barrier movement operator.

FIG. 6 is a top plan view of the barrier movement operator 12 portion of the elongate member 33 and portion of the trolley rail 18. The barrier movement operator 12 is secured to the elongate member 33 by means of a plurality of bolts 41 which extend through the elongate member 33 into threaded holes in the barrier movement operator. Similarly, the trolley rail 18 is secured to the top of barrier movement operator 12 by means of a pair of bolts 43 through the rail and into barrier movement operator, Also shown in FIG. 6 is a drive sprocket 45 which is rotated by a motor (not shown) to move a chain 47 which is attached to trolley 20. Mains voltage may be provided to the barrier movement operator by a multi conductor power wire 49 which passed through one of the hollow vertical supports 35 and into the hollow trough 34 of elongate member 33. Power wire 49 runs along the interior 34 of elongate member 33 and is passed to the barrier movement operator 12 via an opening 51 in the elongate member.

The elongate member 33 also includes a number of points at which accessories can be attached to provide additional functionality. As shown in FIG. 3, light fixtures 53 and 54 are attached to a portion of the elongate member 33 to the left of the barrier movement operator 12 and light fixtures 55 and 56 are attached to the right. Further, a retractable cord, mechanic's light 58 is attached to the elongate member as is a retractable hose reel 59 for supplying compressed air from a compressor 52. In other embodiments, other accessories such as a battery charger, security camera, CO monitor, motion detector etc., may be attached to the elongate member 33.

Figure 5:
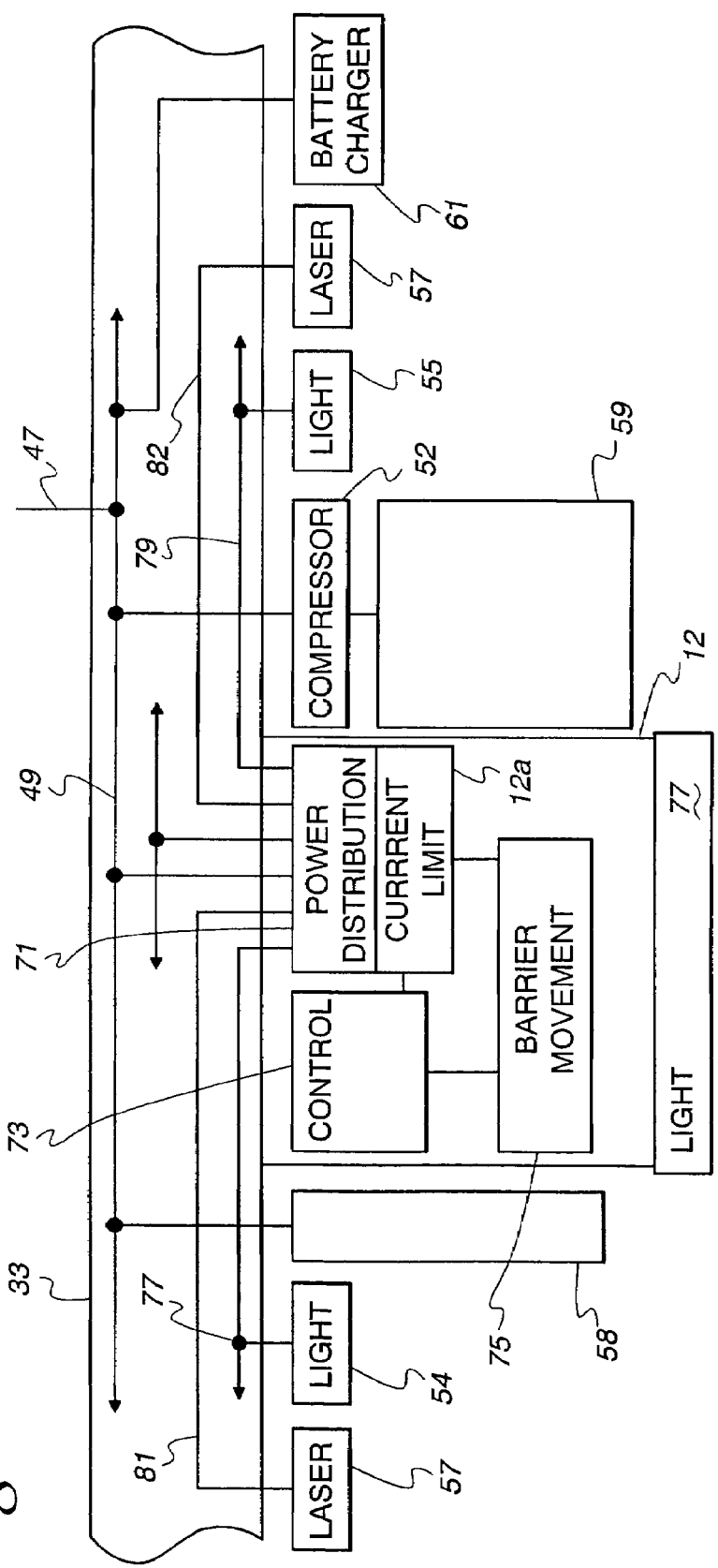
FIG. 5 is an electrical block diagram illustrating power distribution.

FIG. 5 is an electrical block diagram illustrating the connection and distribution of electrical power using the arrangement of FIG. 2. In FIG. 5 a portion of the elongate member 33 is shown to represent its power distribution or power bus function and barrier movement operator 12 is shown in block diagram form. Barrier movement operator 12 comprises power distribution apparatus 71, a controller 73, barrier movement apparatus 75 and a light assembly 77. Barrier movement apparatus 75 may include a motor and sensors (not shown) which cooperate with control unit 73 to open and close a barrier. Power distribution unit 71 is equipped to receive mains voltage and to distribute mains voltage, or another created voltage, under the control of controller 73. The light 77 is a common part of barrier movement operators and is used to provide one source of illumination under the control of controller 73.

Power wire 49 is connectable to a source of mains voltage and connects that voltage to power distribution unit 71. Power distribution unit 71 distributes power within barrier movement operator 12 as is needed to provide barrier movement. Controller 73 is also responsible for controlling the application of mains voltage and other electrical power derived therefrom to accessories connected to barrier movement operator 12.

The following are examples of power distribution via elongate member 33. The mains power on power conductor 49 may be distributed directly to attached accessories on elongate member 33 by connection to the power conductor. For example, one accessory may be a "night light" which is continuously powered, but which senses light levels and turns on the "night light" when light levels drop below a predetermined level. Further, the mechanics' light and cord reel 58 and the compressor 52 may be permanently supplied with mains power by connection to power conductor 49. A battery charger 61 may also be permanently connected to mains power. AC mains power may be selectively provided to accessories by the power distribution unit 71 under the control of controller 73. For example, when a left hand garage door is being opened lights 54 and 53 may receive mains power from power distribution 71 via conductor 77. Similarly, lights 55 and 56 may receive mains power from power distribution unit 71 via conductor 79 when a right hand garage door is being opened. Further, laser positioning devices 57 may receive power via conductor 81 or 82 to create a light spot only briefly when a vehicle is entering one side or the other of the garage. The power sent to a laser light 57 may be AC mains or DC created by power distribution 71 under control of controller 73. In addition, conductors 91 may be employed by power distribution 71 to distribute low voltage power along elongate member 33.

In the preceding embodiments, elongate member is shown as being open at the top. The elongate member may be closed on its top to provide protection against improper contact with household voltage. The barrier movement operator is shown in the preceding, attached to the underside of the elongate member. In other embodiments, the barrier movement operator may be attached to the top of the elongate member and rest thereon. Mains power was supplied to the apparatus by a power cord 49 passing through a hollow vertical support 35. In other embodiments, the power cord may be connected to mains power without passing through a vertical support and such power may be supplied directly to barrier movement operator 12 via a power cord as shown in FIG. 1.

While there has been illustrated and described particular embodiments of the present invention, it will be appreciated that numerous changes and modifications will occur to those skilled in the art, and it is intended in the appended claims to cover all those changes and modifications which fall within the true scope of the present invention.

The invention claimed is:

1. A support apparatus for overhead mounting of a barrier movement operator having a width, the barrier movement operator including a controller, the support apparatus comprising:

a semi rigid elongate member having a length greater than the width of the barrier movement operator;

a plurality of upper supports connected to the elongate member for attaching the elongate member to an overhead structure and suspending the elongate member from the overhead structure so as to be separate from the overhead structure, the elongate member being substantially rigidly connected to the overhead structure in a substantially horizontal plane;

connection apparatus for connecting the elongate member to the barrier movement operator;

a plurality of electrically powered accessories supported by the elongate member;

a power distribution system responsive to the controller for distributing electrical power to the electrically powered accessories; and an apparatus for removably connecting the power distribution system to a mains voltage source;

wherein the barrier movement operator provides electrical power to the power distribution system.

2. A support apparatus according to claim 1 wherein the barrier movement operator selectively connects electrical power to the power distribution system.

* * * * *